United States Patent [19]

Aquino et al.

[11] Patent Number: 5,598,618
[45] Date of Patent: *Feb. 4, 1997

[54] MAINROTOR MACHINING PROCESS AND APPARATUS

[76] Inventors: Giovanni Aquino, 29 Byron Ave., Kenmore, N.Y. 14223; Ewan Choroszylow, 125 Church St., East Aurora, N.Y. 14052

[*] Notice: The terminal 72 months of this patent has been disclaimed.

[21] Appl. No.: 414,708

[22] Filed: Sep. 29, 1989

[51] Int. Cl.⁶ ............................ B23P 15/02; B23F 15/08
[52] U.S. Cl. .......................... 29/889; 409/26; 409/48; 409/51; 409/56; 451/249
[58] Field of Search .............. 29/156.4 R, 156.8 R, 29/156.8 B, 156.8 CF, 159.2, 23.5; 409/56, 76, 13, 12, 26, 48, 51, 84, 131, 132, 191, 66; 51/123 G, 105 SP, 95 LH

[56] References Cited

U.S. PATENT DOCUMENTS

| | | | |
|---|---|---|---|
| 2,388,173 | 10/1945 | Miller | 51/123.6 |
| 3,875,635 | 4/1975 | Pavlov et al. | 29/159.2 |
| 4,109,362 | 8/1978 | Ingalls | 29/156.4 R |
| 4,170,164 | 10/1979 | Nelson | 409/13 |
| 4,586,204 | 5/1986 | Shackleton | 51/105 SP |

FOREIGN PATENT DOCUMENTS

| | | | |
|---|---|---|---|
| 2719316 | 11/1977 | Germany | 409/48 |
| 2812433 | 12/1978 | Germany | 409/26 |
| 7408947 | 1/1976 | Netherlands | 409/26 |
| 994800 | 2/1983 | U.S.S.R. | 29/156.8 R |

*Primary Examiner*—William Briggs
*Attorney, Agent, or Firm*—Edwin T. Bean, Jr.; Martin G. Linihan; John C. Thompson

[57] ABSTRACT

A method and apparatus for making a globoid screw for use as a mainrotor in a compressor or expander wherein a cylindrical rotor body is mounted for rotation about the longitudinal axis thereof, a cutter having a plurality of teeth at spaced locations around a circumference disposed in a plane and having an axis of rotation disposed perpendicular to that plane is mounted for rotation about its axis and is disposed so that the plane thereof is parallel to the rotor body longitudinal axis and so that the cutter rotational axis is perpendicular to the rotor longitudinal axis, and the rotor body and the cutter are rotated at synchronized speeds. The rotor body and cutter are positioned relative to each other in a manner moving the cutter axis of rotation and the rotor body longitudinal axis relative to each other to decrease the distance between the axes during rotation of the cutter and rotor body so that the cutter teeth contact the rotor body curing each cutter rotation to remove material from the rotor body by a milling action to form a globoid screw profile including a groove having a pair of spaced-apart sidewalls and extending along the rotor body in a helical path. The relative speed between the rotor body and the cutter is changed by a given amount for a given time to effect a positional change between the cutter teeth and the material of the rotor body thereby resulting in a desired change in the globoid screw profile.

47 Claims, 4 Drawing Sheets

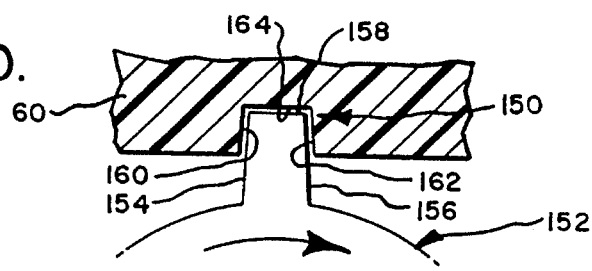
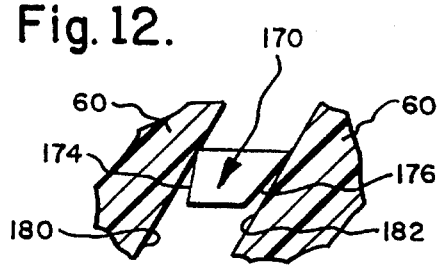
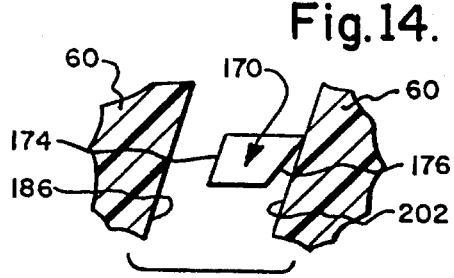
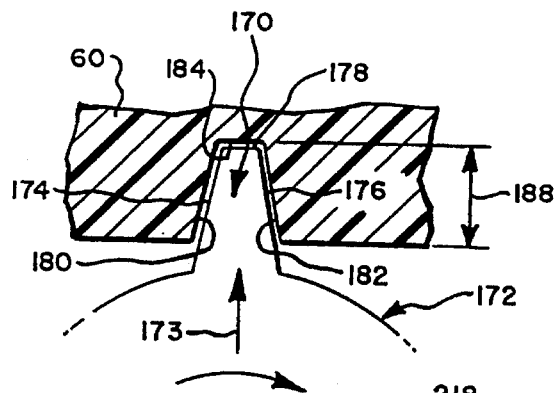
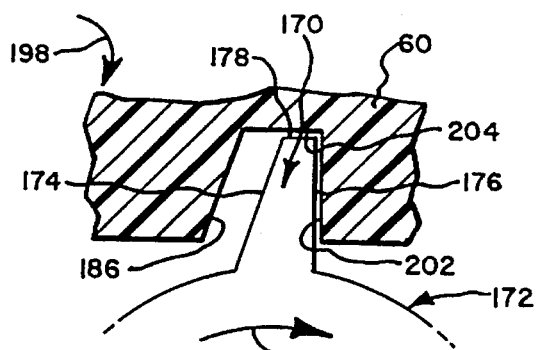
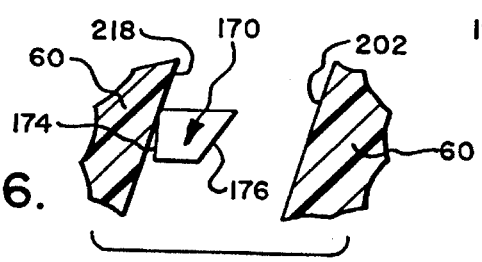
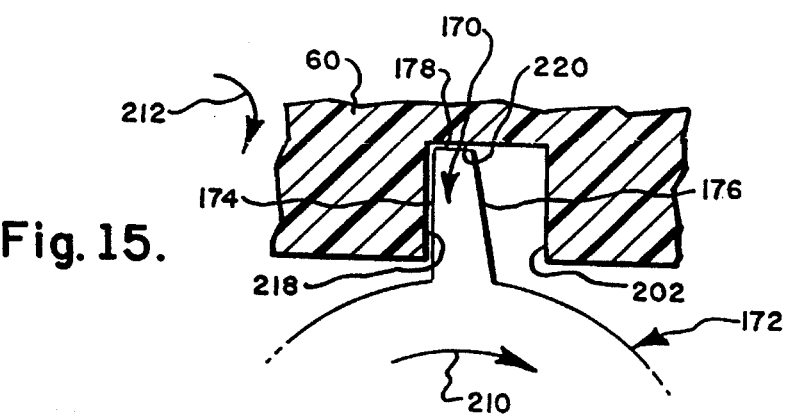

MAINROTOR MACHINING PROCESS AND APPARATUS

BACKGROUND OF THE INVENTION

This invention relates to the art of globoid screws for use as mainrotors in compressors, expanders and the like, and more particularly to a new and improved method and apparatus for making a globoid screw for such use.

One area of use of the present invention is machining mainrotors for single screw compressors or expanders, although the principles of the present invention can be variously applied. In a single screw compressor or expander the mainrotor is in the form of a globoid screw which has a helical groove defining a helical thread along the length of the rotor and is machined from a cylindrical body of suitable material, typically metal.

In the manufacture of such mainrotors, the machining process presents a number of considerations. It should, of course allow rapid cutting to reduce machining time in a manner avoiding undue tool stresses and wear. Advantageously the cutting tool should provide a high degree of variability in cutting action. In addition, it would be highly desirable to provide a machining process and apparatus whereby the final and desired mainrotor groove geometry is not dictated by or limited to the geometry, i.e. profile and shape, of the cutting tool, so that a given cutting tool has the potential to generate different mainrotor geometries and with different allowable tolerance definitions or goals.

SUMMARY OF THE INVENTION

It is, therefore, a primary object of this invention to provide a new and improved method and apparatus for making a globoid screw for use as a mainrotor in a compressor or expander.

It is a further object of this invention to provide such method and apparatus whereby the final and desired mainrotor groove geometry is not dictated by or limited to the geometry of the cutting tool.

It is a further object of this invention to provide such a method and apparatus which provides rapid operation without undue tool stress and wear.

It is a further object of this invention to provide such a method and apparatus which allows a high degree of variability in cutting action.

It is a further object of this invention to provide such a method which is efficient, effective and economical.

The present invention provides a method and apparatus for making a globoid screw for use as a mainrotor in a compressor or expander wherein a cylindrical rotor body is mounted for rotation about the longitudinal axis thereof, a cutter having a plurality of teeth at spaced locations around a circumference disposed in a plane and having an axis of rotation disposed perpendicular to that plane is mounted for rotation about its axis and is disposed so that the plane thereof is parallel to the rotor body longitudinal axis and so that the cutter rotational axis is perpendicular to the rotor longitudinal axis, and the rotor body and the cutter are rotated at synchronized speeds. The rotor body and cutter are positioned relative to each other in a manner moving the cutter axis of rotation and the rotor body longitudinal axis relative to each other to decrease the distance between the axes during rotation of the cutter and rotor body so that the cutter teeth contact the rotor body during each cutter rotation to remove material from the rotor body by a milling action to form a globoid screw profile including a groove having a pair of spaced-apart sidewalls and extending along the rotor body in a helical path. The relative speed between the rotor body and the cutter is changed by a given amount for a given time to effect a positional change between the cutter teeth and the material of the rotor body thereby resulting in a desired change in the globoid screw profile, the relative speed being increased or decreased depending upon which groove sidewall is being machined and the speed change being to an extent depending upon the desired groove sidewall location. As a result, a single cutter has the potential to generate different mainrotor geometries and with different tolerance definitions or goals.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 10 is a fragmentary radial view illustrating an initial stage in formation of the groove in the rotor body;

FIGS. 11 and 12 are fragmentary radial and side elevational views, respectively, illustrating the stage in the formation of the groove where final groove depth is reached;

FIGS. 13 and 14 are fragmentary radial and side elevational views, respectively, illustrating one aspect of the relative speed change introduced between rotor body and cutter according to the present invention; and FIGS. 15 and 16 are fragmentary radial and side elevational views, respectively, illustrating another aspect of the relative speed change introduced between rotor body and cutter according to the present invention.

DETAILED DESCRIPTION OF THE ILLUSTRATED EMBODIMENTS

Figure 1:
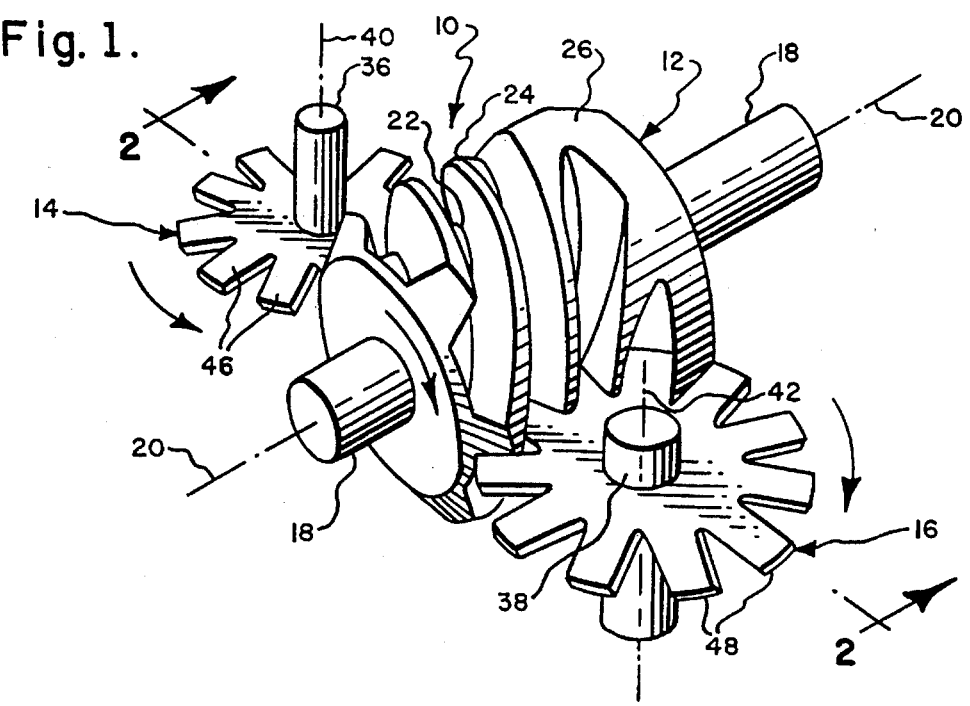
FIG. 1 is a perspective view with parts removed of the mainrotor and gaterotors of a single screw compressor.
Figure 2:
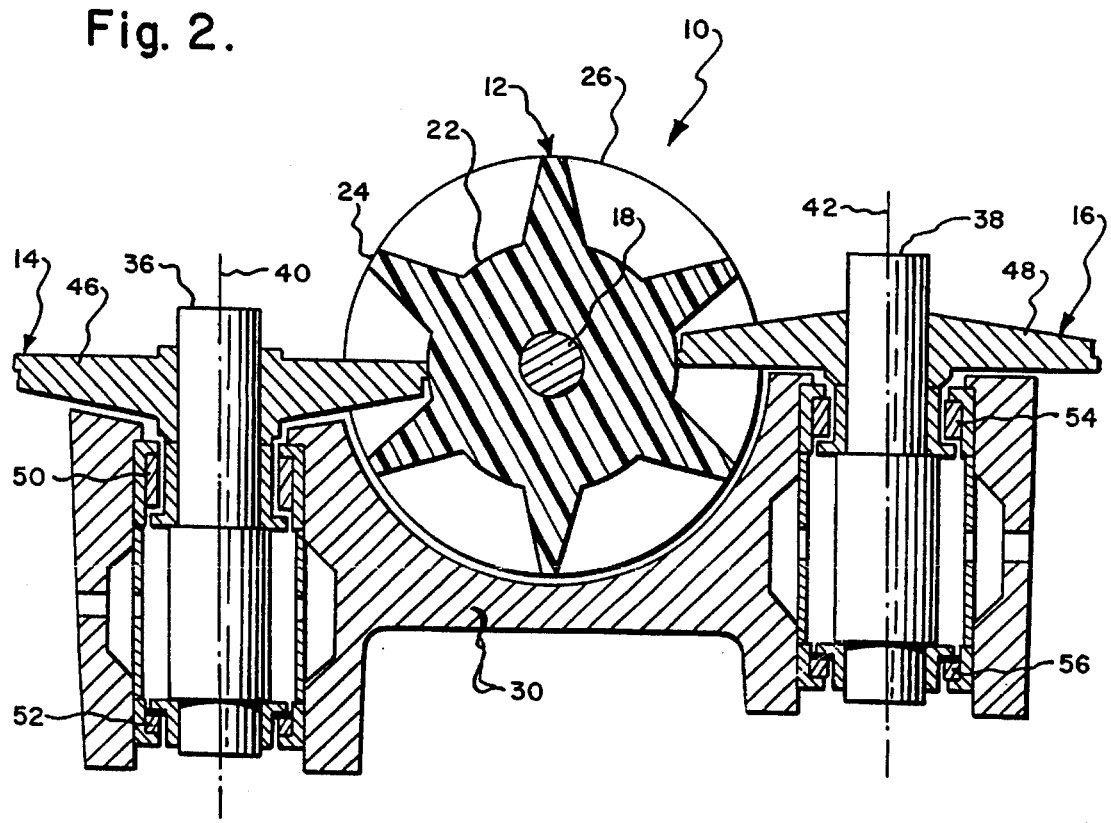
FIG. 2 is a sectional view taken about on line 2—2 in FIG. 1.

FIGS. 1 and 2 illustrate a single screw compressor generally designated 10 including, briefly, a mainrotor 12 and a pair of gaterotors and 14 and 16. Mainrotor 12 is in the form of a globoidal screw which has a shaft 18 mounted to rotate about an axis 20 as shown in FIG. 1 and is provided with a helical groove 22 which defines a helical thread 24 in a rotor body 26. Mainrotor 12 is illustrative of mainrotors machined by the process to be described herein. The crest of thread 24 is disposed on a cylindrical surface which is symmetrical with respect to the axis of rotation 20 and co-operates with a casing, a portion of which is designated 30 in FIG. 2.

The gaterotors 14 and 16 are in the form of worm wheel and have shafts 36 and 38 mounted for rotation about axes 40 and 42, respectively, as shown in FIG. 1. Gaterotor 14 has a plurality of teeth 46 around the circumference thereof, extending radially outwardly and disposed in a common plane which is substantially perpendicular to the axis of rotation 40. Similarly, gaterotor 16 has a plurality of teeth 48 around the circumference thereof, extending radially outwardly and disposed in a common plane which is substantially perpendicular to the axis of rotation 42. The axes of rotation 40 and 42 of gaterotors 14 and 16, respectively, are mutually substantially parallel and are disposed substantially perpendicular to the axis of rotation 20 of mainrotor 12. Gaterotors 14 and 16 are rotatably mounted in casing 30 by means of bearing assemblies 50,52 and 54,56, respectively. In the compressor of this illustration, as shown in FIG. 2, the teeth 46 and 48 of gaterotors 14 and 16, respectively, lie in planes which are slightly offset.

In operation, the teeth 46 and 48 of gaterotors 14 and 16, respectively, define with the rotor thread 24 fluid expansion or compression chambers which are successively put into communication with an output port for high pressure fluid in a manner well-known to those skilled in the art. While a single screw compressor is shown in FIGS. 1 and 2, the present invention is applicable to the machining of globoid screw mainrotors for use in dynamic fluid energy converters including compressors and expanders.

Figure 3:
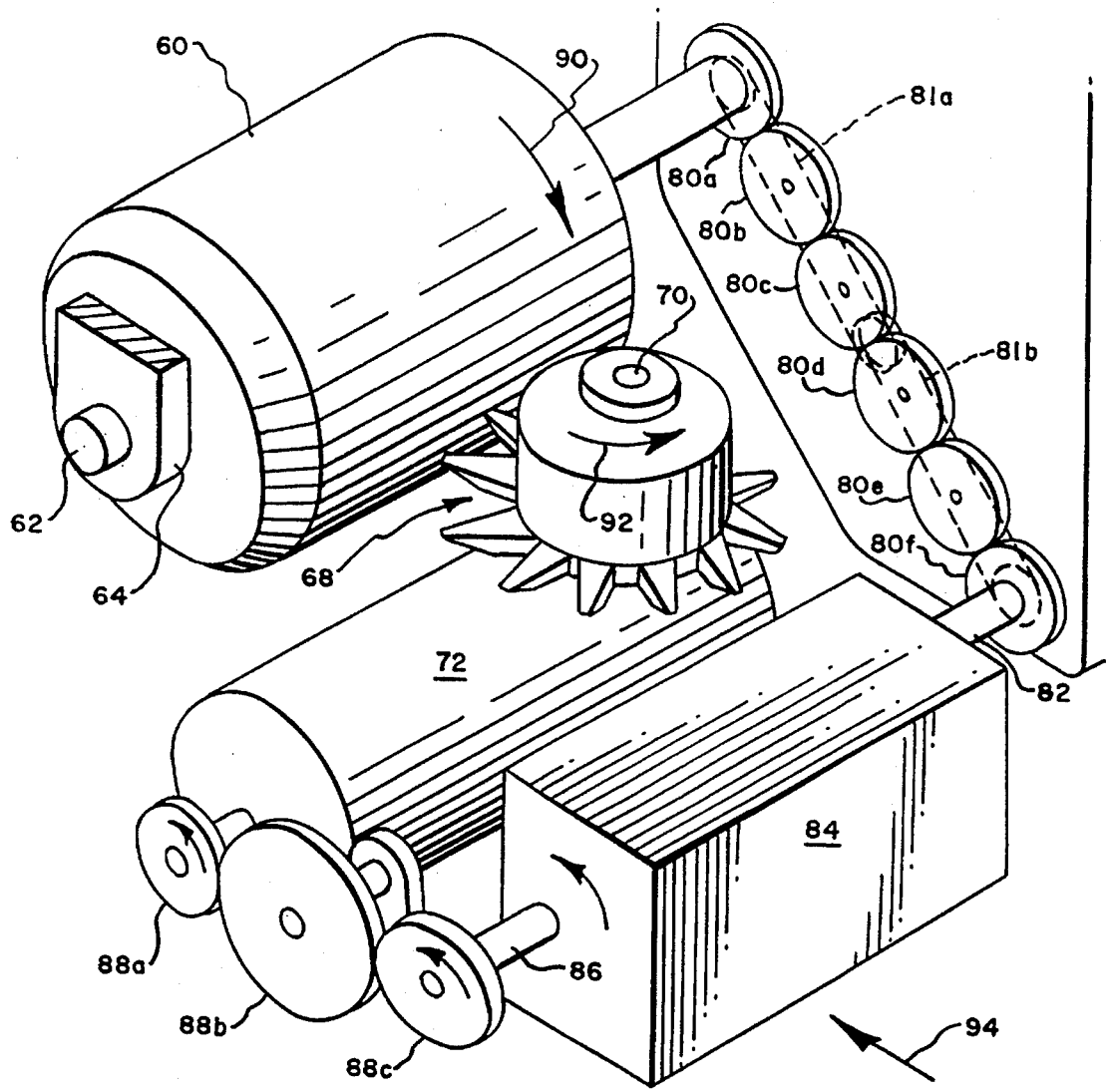
FIG. 3 is a diagrammatic perspective view of apparatus for carrying out the mainrotor machining process of the present invention.

FIG. 3 illustrates apparatus for carrying out the mainrotor machining process. A cylindrical rotor body 60 to be machined is mounted on a shaft 62 rotatably supported by a bracket 64. A cutter generally designated 68 is mounted on a shaft 70 having an axis disposed at a right angle to the axis of shaft 62. Cutter 68 can be mounted in the orientation shown in FIG. 3 with the cutting edges up, or it can be inverted to have the cutting edges down. Cutter shaft 70 is connected to the output of a right-angle gear box 72 which operates to rotate cutter 68 about the axis of shaft 70. Rotor body 60 is rotated by suitable means (not shown), and the rotation of shaft 62 is transmitted through a series of gears 80a–80f to the input shaft 82 of a speed controller or phase changer 84. The output shaft 86 of phase changer 84 is connected through a series of gears 88a–88c to an input shaft of gear box 72. In the arrangement shown, during a cutting operation rotor body 60 is rotated in the direction of arrow 90, cutter 68 is rotated in the direction of arrow 92 and the combination of phase changer 84, gear box 72 and cutter 68 is moved linearly toward rotor body 60 in the direction of arrow 94.

In particular, gears 80a–80f define a parallelogram type of transmission such that when phase changer 84, gear box 72 and cutter 68 move toward body 60, no angular motion of cutter 68 occurs due to relative motion of the gear train 80. In this connection, gear train 80a–80f is divided into two sets with gears 80a–80c of one set being rotatably mounted on a first arm 81a which is pivotally mounted at one end to shaft 62, the gears 80d–80f of the second set being rotatably mounted on a second arm 81b which is pivotally mounted at one end to shaft 82, and with the other ends of arms 81a, 81b being hinged together.

The cutter 68 employed in the mainrotor machining process is a multi-toothed, star-shaped cutter to generate the required mainrotor profile. Cutter 68 provides a milling/planing/lathe-type action to achieve removal of material from the workpiece. Both the mainrotor workpiece 60 and cutter 68 are rotated in synchronous motion. In particular, the relative rotation between cutter 68 and rotor body 60 required for material removal is established by rotating body 60 and cutter 68 at speeds proportional to the ratio of mainrotor grooves to gaterotor teeth. For example, in the illustrative arrangement of FIGS. 1 and 2, mainrotor 12 has six grooves as seen best in FIG. 2, each gaterotor 14, 16 has eleven teeth and therefore the speed of cutter 68 is 6/11 times the speed of body 60. In addition, upon initiation of machining, the axis of rotation of cutter 68 moves relative to the axis of rotation of rotor body 60. This motion is toward mainrotor body 60 as indicated by arrow 94 in FIG. 3. During such motion, however, the radius of rotation of cutter 68 remains constant. The feed rate in the direction of arrow 94 is determined by the material of block 60, the material and strength of cutter 68, the nature of cutter 68, stiffness of the supports of body 60 and cutter 68, whether or not cooling is employed, and the power supplied.

The multi-point machining process utilizing the multi-toothed cutter 68 is a rapid approach since a number of teeth are removing material at the same time. This approach also results in significantly lower tool stresses and tool wear. Additionally, if one or two teeth break, machining may not have to be suspended. Furthermore, the multi-point cutter incorporates cutting edges that remove material by the action of the tool flanks and the front edge with the majority of cutting occurring on the flanks. As a result, a high degree of variability is possible with this multi-point approach. Each tooth may cut on each side, alternate teeth may cut alternate flanks of the mainrotor groove 22, and some teeth may be configured to provide only light finishing cuts, all of which will be described in detail presently. Cutter 68 typically has a number of teeth equal to the number of teeth of the gaterotor to be associated with the mainrotor being machined. Cutter 68 could have fewer teeth which would result in a slower rate of material and consequently a longer machining time.

The profile and shape of each cutter tooth is not equivalent to the shape of the final and desired mainrotor groove geometry. Final geometry is achieved by an additional degree of freedom applied to the cutter 68 during its synchronized rotation with respect to mainrotor body 60. This extra degree of freedom is a relative speed change between cutter 68 and mainrotor body 60 effected by phase changer 84 during the cutting process. In particular, phase changer 84 introduces a small and momentary but important change in the speed of rotation of cutter 68 while keeping the speed of rotation of mainrotor body 60 constant which shifts the position of the cutting edge of cutter 68 relative to the material of body 60 during the machining operation wherein the speed change introduces an angular phase change. This may be viewed as a positional phase change wherein the speed change introduces an angular phase change. Alternatively, the speed of mainrotor body 60 could be changed while keeping the speed of cutter 68 constant to achieve the same results. The foregoing allows use of a multipoint tool or cutter 68 in a very flexible way with the result that a given cutter has the potential to generate different mainrotor geometries and with different allowance tolerance definitions or goals.

The mainrotor machining process allows many combinations of the parameters of cutter profile and resultant groove geometry. The cutter design is a function of the mainrotor material being cut, the horsepower available for cutting, the speed at which it is desired to cut, whatever amount of pre-machining may be required, and the surface finish of the groove to mention a few. Each multipoint tool has the capability to produce unique variations of the mainrotors. For example, it is possible to generate mainrotors which provide different clearances with mating parts and different allowable tolerance ranges utilizing the same cutter, on the same machine tool, and under the same set-up, i.e. the cutter not being removed.

Figure 4:
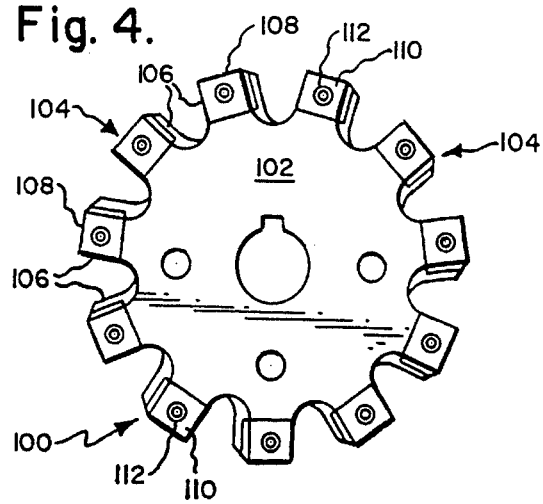
FIG. 4 is a plan view of one form of cutter for use in the apparatus of FIG. 3.
Figure 5:
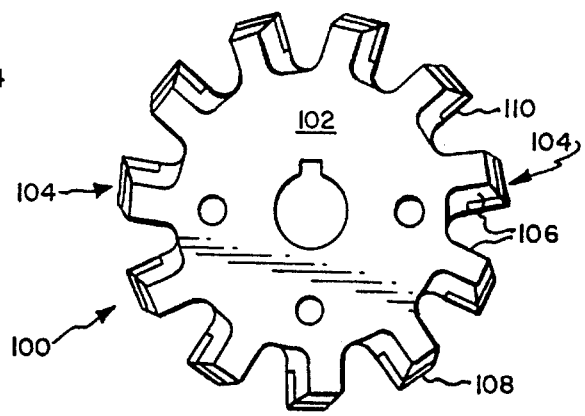
FIG. 5 is an opposite plan view of the cutter of FIG. 4.

Mainrotor machining operations can be carried out with a single cutter or performed using a plurality of cutters. As an example of the latter, the process would be initiated with a first or rough cutter, continued with a second or intermediate cutter, and concluded with a third or finishing cutter. This is illustrated in FIGS. 4–9 wherein opposite faces of a first or rough cutter 100 are shown in FIGS. 4 and 5. Cutter 100 has a disc-like main body 102 and a plurality of identical teeth 104 circumferentially spaced and extending radially outwardly from body 102. Each of the teeth 104 has relatively short flanks 106, is of substantially constant width and terminates in a relatively wide front or outer edge 108. On one face of each tooth 104 a recessed flat is machined to receive a carbide insert 110 secured by a suitable fastener 112 to improve the wear and operation of cutter 100.

Figure 6:
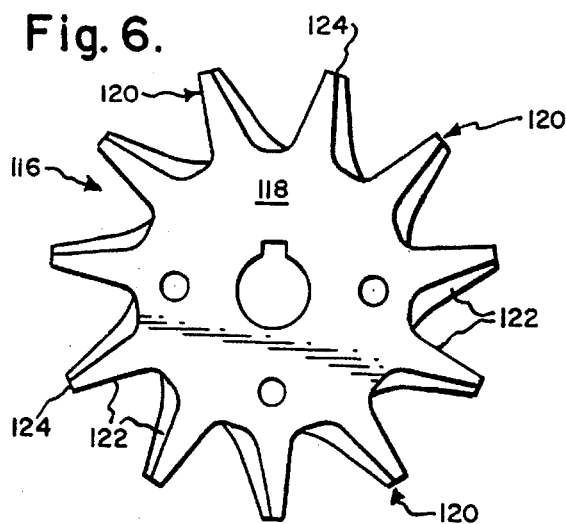
FIG. 6 is a plan view of another form of cutter for use in the apparatus of FIG. 3.
Figure 7:
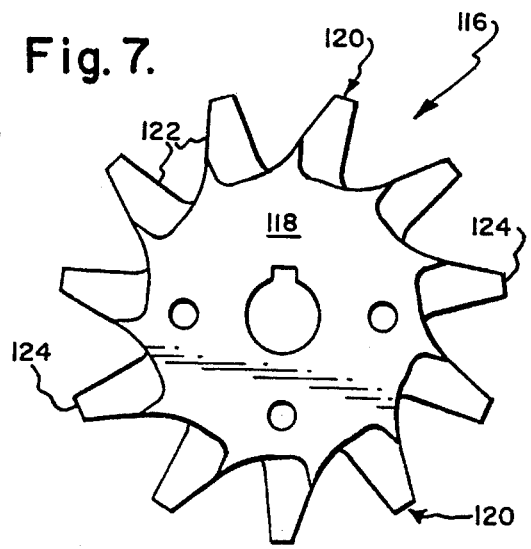
FIG. 7 is an opposite plan view of the cutter of FIG. 6.
Figure 8:
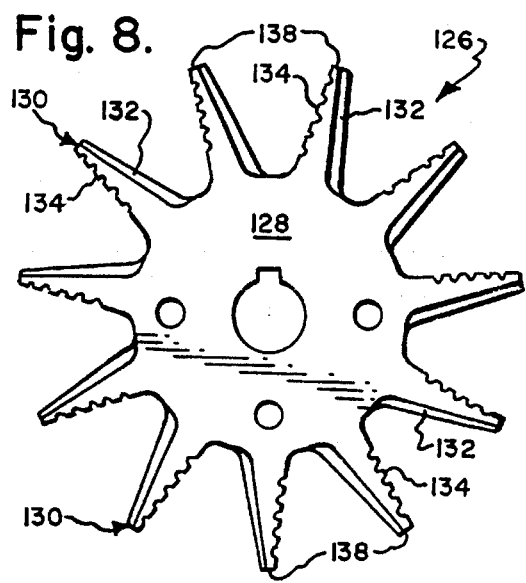
FIG. 8 is a plan view of still another form of cutter for use in the apparatus of FIG. 3.
Figure 9:
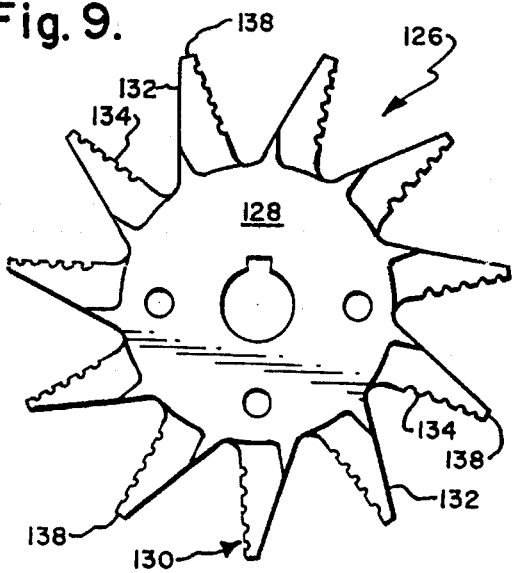
FIG. 9 is an opposite plan view of the cutter of FIG. 8.

FIGS. 6 and 7 illustrate an intermediate cutter 116 having a disc-like main body portion 118 and a plurality of substantially identical teeth 120 circumferentially spaced and extending radially outwardly from body 118. Each of the teeth has relatively longer flanks 122 as compared to cutter 100, is of radially outwardly tapering width, and terminates in a relatively shorter outer edge 124. FIGS. 8 and 9 illustrate a finishing cutter 126 having a disc-like main body portion 128 and a plurality of identical teeth 130 circumferentially spaced and extending radially outwardly from body 128. Each tooth has a smooth flank 132 and a serrated flank 134. The flanks are slightly longer than those of cutter 126 with the result that each tooth tapers out to a relatively shorter outer edge 138.

The serrated edges shown on cutter 126 are for the purpose of producing smaller metal chips during cutting so as to reduce loading on the tool. Also, as illustrated in FIGS. 8 and 9, each tooth of cutter 126 has only one cutting edge, i.e. the edge with serrations 134. This is for the purpose of reducing loading. On the other hand, if there is no loading problem, each cutter tooth can have two cutting edges. This, in turn, would provide the advantage of avoiding the need to invert the cutter when cutting is switched from one groove flank to the other as will be described. With the single edge cutter 126 shown in FIGS. 8 and 9, it is necessary to invert the cutter when changing the cutting operation from one groove flank to the other.

In view of the foregoing, it is apparent that a wide variety of cutter sizes, geometries and configurations is possible. Thus single cutting edges to reduce loading is illustrated in FIGS. 8 and 9. Another approach to reducing loading is alternate cutting edges. For example, and referring to FIGS. 6 and 7, alternate edge cutting can be accomplished by having the right hand flanks of every other tooth 120 be a cutting edge. In addition, if the left-hand flank of every other tooth 120 also is a cutting edge, cutter 126 would not have to be inverted when changing the cutting operation from one groove flank to the other. Alternate cutting edges are employed to reduce loading, but if a loading problem can be avoided cutting edges can be provided on both flanks of each cutter tooth.

FIGS. 10–16 show various stages during the formation of groove 22 in body 60 by the mainrotor machining process of the present invention. In each of the views, groove 22 includes a pair of sidewall surfaces extending from a groove bottom wall, and these are shown in the respective views at various stages of formation. Furthermore, while each of the views shows only a single cutter tooth for convenience in illustration, whatever is shown in each view occurs for all of the cutter teeth. FIG. 10 shows the initial stage in formation of the groove in body 60 as each cutter tooth begins to gradually remove material from body 60. In particular, a single tooth 150 of a cutter 152 is shown during the early stage of progressive penetration into body 60 as cutter 152 and body 60 are rotated relative to each other at synchronized rates and during the early stage of progressive linear movement of cutter 152 toward body 60 as previously described. Cutter tooth 150 has a pair of flanks 154, 156 extending radially outwardly from the disc-like cutter body and which terminate in an outer edge 158. The groove shown in FIG. 10 at the stage of formation illustrated therein has a pair of sidewalls 160 and 162 which are formed by the cutting action of cutter tooth flanks 154 and 156, respectively, and an inner or bottom wall 164 formed by the cutting action of cutter tooth edge 158. While only a single tooth 150 is shown, it is to be understood that cutter 152 has a plurality of teeth identical to tooth 150 extending radially outwardly from the body of cutter 152 and at spaced locations around the circumference thereof similar to the cutters illustrated in FIGS. 4–9. As a result, as body 60 and cutter 152 are rotated relative to each other and cutter 152 is moved linearly gradually toward body 60 as previously described, the groove sidewalls 160,162 and inner wall 164 are formed along body 60 in a helical path. In addition, while cutter 152 shown in FIG. 10 resembles cutter 100 illustrated in FIGS. 4 and 5, the foregoing operation can be performed with any selected cutter of multi-tooth, star-shaped configuration.

FIGS. 11 and 12 illustrate the stage in formation of the groove where the final groove depth is reached. In particular, a single tooth 170 of cutter 172 is shown at the end of progressive penetration into body 160 as cutter 172 and body 60 are rotated relative to each other at synchronized rates and, accordingly, at the end of progressive linear movement of cutter 172 toward body 60 in the direction of arrow 173 as previously described. Cutter tooth 170 is of radially outwardly tapering width and has a pair of flanks 174, 176 extending radially outwardly from the disc-like cutter body and which terminate in an outer edge 178. The groove shown in FIGS. 11 and 12 at the stage of formation illustrated therein has a pair of sidewalls 180 and 182 which are formed by the cutting action of cutter tooth flanks 174 and 176, respectively, and an inner or bottom wall 184 formed by the cutting action of cutter tooth edge 178. The final depth of the groove is measured between groove inner wall 184 and the outer surface of body 60, and the final depth is indicated by the dimension designated 188 in FIG. 11. While only a single tooth 170 is shown, it is to be understood that cutter 172 has a plurality of teeth identical to tooth 170 extending radially outwardly from the body of cutter 152 and at spaced locations around the circumference thereof similar to the cutters illustrated in FIGS. 4–9. As a result, as body 60 and cutter 172 are rotated relative to each other and cutter 172 is moved gradually toward body 60 as previously described, the groove sidewalls 180, 182 and inner wall 184 are formed along body in a helical path. In addition, while cutter 172 shown in FIGS. 11 and 12 resembles cutter 116 illustrated in FIGS. 6 and 7, the foregoing operation can be performed with any selected cutter of multi-tooth, star-shaped configuration. Furthermore, the formation of the groove from the initial stage illustrated in FIG. 10 to the stage of final depth illustrated in FIGS. 11 and 12 can be performed with different cutters at different stages as in the illustrative operation described herein, or it can be performed using a single cutter from initial to final depth.

It will be apparent from considering FIG. 11 that at this stage in formation of the groove, the groove geometry is substantially equivalent to the profile and shape of the cutter teeth. In this connection, and with the exception of alternate flank cutters as previously described, each cutter employed in the mainrotor machining process has teeth of identical shape, profile and size. However, as indicated previously, an important and advantageous result of the mainrotor machining process of the present invention is that the profile and shape of each cutter tooth is not equivalent to the shape of the final and desired mainrotor groove geometry. In accordance with the present invention, final groove geometry is achieved by an additional degree of freedom applied to the cutter during its synchronized rotation with respect to mainrotor body 60, This extra degree of freedom involves a momentary relative speed change between the rotation of the cutter and the rotation of mainrotor body 60 effected by phase changer 84. In particular, phase changer 84 introduces a small but important momentary change, i.e. momentary increase or decrease, in the speed of rotation of the cutter while keeping the speed of rotation of mainrotor body 60 constant which shifts the position of the cutting edge of the cutter relative to the material of body 60 during the machining operation thereby determining the final geometry of the groove sidewalls. This may be viewed as a positional phase change wherein the speed change introduces an angular phase change. Depending upon which groove sidewall is to be machined, the cutter rotational speed is increased or decreased relative to the speed of rotation of mainrotor body 60 as illustrated in FIGS. 13–16.

The foregoing is explained further by the following illustration. Consider two vehicles travelling 60 m.p.h. side-by-side along the highway. For a brief moment, the operator of one vehicle increases speed to 65 m.p.h. while the other vehicle continues travelling at 60 m.p.h. The faster vehicle will advance in position relative to the other vehicle. When the speed of the one vehicle is returned back to 60 m.p.h. the two vehicles will continue along the highway at a fixed distance apart. Thus, the momentary relative speed change results in a relative positional change.

Referring first to FIGS. 13 and 14, for convenience in illustration the same cutter 172 is shown which was employed to reach final groove depth as described in connection with FIGS. 11 and 12. Cutter 172 is rotating in the direction indicated by arrow 196 and rotor body 60 is rotating in the direction indicated by arrow 198. During the stage of the machining process illustrated in FIGS. 13 and 14, the rotational speed of cutter 172 is increased momentarily relative to its synchronized or in phase speed at which final groove depth was reached with the result that cutter flank 176 and edge 178 remove additional material from body 60 inwardly of the initially formed groove sidewall 182 to define a new and final groove sidewall 202. A partially completed groove inner wall 204 also is defined. The location of the final groove sidewall 202 will be determined by the extent of the increase in rotational speed of cutter 172 introduced by phase changer 84. Furthermore, this is done in a step-wise or incremental manner for several reasons. One is to prevent over-cutting, i.e. overshoot, a second is to be consistent with the strength and cutting capability of the tool, and a third is to allow time to cut along the entire helical path containing the plurality of rotor grooves. By way of example, in an illustrative apparatus, phase changer 84 comprises a phase positioner commercially available from Candy Corp. under the designation model POS1-2 having a manually operable rotatable control associated with a dial calibrated in degrees to give an indication in degrees of a leading or lagging relationship between the rotation of the input and output shafts of the plane changer 84. Thus a desired phase change, i.e. leading or lagging relationship, between rotor body and cutter rotational speeds, is selected by an appropriate setting of the control. in particular, an incremental phase change is selected by the operator, and the sound of the cutting operation is monitored audibly by the operator to determine when that increment or portion of the cut is completed and the next incremental phase change can be introduced.

Since the angular disposition, i.e. degree of taper of the cutter flank 176 is known, the angular phase change needed to define parallel groove sidewalls can be determined. This can be seen by comparing the angular change in position of flank 176 in FIGS. 11 and 13. In this connection, the final groove sidewalls are required to be parallel in the plane of the gaterotor for desired proper operation. During the foregoing operation, the rotational axis of cutter 172 remains stationary relative to the axis of rotation of rotor body 60. While only the single tooth 170 is shown in FIGS. 13 and 14, the foregoing occurs with each of the plurality of cutter teeth so that as cutter 172 and rotor body 80 are rotated in the foregoing manner, groove sidewall 202 and inner wall 204 are formed along body 80 in a helical path. In addition, while cutter 172 was shown for convenience in illustration, the foregoing operation can be performed with any selected cutter compatible with the groove geometry existing when the final groove depth has been reached.

Referring now to FIGS. 15 and 18, cutter 172 is rotating in the direction indicated by arrow 210 and rotor body 60 is rotating in the direction indicated by arrow 212. During the stage of the machining process illustrated in FIGS. 15 and 16, the rotational speed of cutter 172 is decreased relative to its previous or in phase speed at which final groove depth was reached with the result that cutter flank 174 and edge 178 remove additional material from body 60 inwardly of the initially formed groove sidewall 180 to define a new and final groove sidewall 218. A final groove inner wall 220 also is defined. The foregoing is done incrementally and under manual control of phase changer 84 as previously described. The location of the final groove sidewall 218 will be determined by the magnitude and duration of the decrease in rotational speed of cutter 172 introduced by phase changer 84. The angular phase change needed to achieve parallel groove sidewalls is determined from the taper of flank 174 as previously described and this can be seen by comparing the angular change in position of flank 174 in FIGS. 11 and 15. During the foregoing operation, the rotational axis of cutter 172 remains stationary relative to the axis of rotation of rotor body 60. While only the single tooth 170 is shown in FIGS. 15 and 16, the foregoing occurs with each of the plurality of cutter teeth so that as cutter 172 and rotor body 80 are rotated in the foregoing manner, groove sidewall 218 and inner wall 220 are formed along body 60 in a helical path. In addition, which cutter 172 was shown for convenience in illustration, the foregoing operation can be performed with any selected cutter compatible with groove geometry existing when the final groove depth has been reached.

Thus, the final or finished groove comprising sidewalls 202 and 218 and inner wall 220 has a geometry different from the profile and shape of cutter teeth 170. Advantageously, final groove geometry is independent of and not limited to cutter tooth geometry so that considerable flexibility and variation is possible in the final geometry of grooves formed by the mainrotor machining process of the present invention. While the foregoing operations were described with cutter speed first momentarily increased and then momentarily decreased to form groove sidewall 202 before sidewall 218, the order could be reversed to form sidewall 218 before sidewall 202 by first momentarily decreasing cutter speed and subsequently momentarily increasing cutter speed.

The present invention is illustrated further by the following example. A mainrotor body of aluminum having an outer diameter of 7.1 inch was rotated at 110 r.p.m. Two cutters were employed during successive stages of the machining operation. The first or roughing cutter having relative wider teeth was of high speed tool steel and had an outer diameter of 6.6 inches. This cutter was rotated at 60 r.p.m. and the feed rate of the cutter toward the rotor body was 0.050 inch/min. The phase change applied to this cutter after final penetration of 1.2 inches was 0.06 degree for each 13 turns of the rotor body. A second or finishing cutter having relatively narrower teeth also of high speed tool steel and of 7.1 inch outer diameter then was employed and rotated at 60 r.p.m. The feed rate of the cutter toward the rotor body was 0.030 inch/min. The cutter penetrated an additional 0.25 inch for a final groove depth of 1.45 inch. The phase change applied to this cutter after final penetration was 0.06 degree for each 13 turns of the rotor body. Phase changer 84 was the Candy Corp. model POS1-2 mentioned above, and right angle gear box 72 was of the type commercially available from Boston Gear.

In the arrangement of FIG. 3, the speed relationship between rotor body 60 and cutter 68 is determined by the transmission including gears 80 and 86, subject to the speed change introduced by phase changer 84. Alternatively, body 60 and cutter can be separately driven by brushless d.c. motors with the speed ratio being controlled by suitable electronic servo control means. The electronic control also provides the phase change required for a desired groove geometry. Since brushless d.c. motors operate at relatively high speed, a speed reducing transmission such as belt and gear is employed between cutter 68 and its drive motor.

It is therefore apparent that the present invention accomplishes its intended objects. While embodiments of the present invention have been described in detail, that is for the purpose of illustration, not limitation.

We claim:

1. A method of making a globoid screw for use as a mainrotor in a compressor or expander comprising the steps of:

a) providing a cylindrical rotor body having a longitudinal axis;

b) mounting said rotor body for rotation about said longitudinal axis;

c) providing a cutter having a plurality of teeth at spaced locations around a circumference disposed in a plane and having an axis of rotation disposed perpendicular to said plane;

d) mounting said cutter for rotation about said axis and with said cutter disposed so that the plane thereof is parallel to said rotor body longitudinal axis and so that the rotational axis thereof is perpendicular to said rotor longitudinal axis;

e) rotating said rotor body and said cutter at synchronized speeds; and f) positioning said rotor body and said cutter relative to each other so that said cutter teeth contact said body to remove material from said rotor body by a milling action to form a globoid screw profile.

2. The method of claim 1, wherein said step of positioning said rotor body and said cutter comprises moving said cutter axis of rotation and said rotor body longitudinal axis relative to each other while said rotor body and said cutter are rotated.

3. The method of claim 2, wherein said cutter axis of rotation and said rotor body longitudinal axis are moved toward each other.

4. The method of claim 1, wherein said step of positioning said rotor body and said cutter comprises moving said cutter toward said rotor body while said rotor body and said cutter are rotated.

5. The method of claim 1, wherein said step of positioning said rotor body and said cutter is performed in a manner such that a plurality of said cutter teeth remove material from said rotor body simultaneously during each rotation of said cutter.

6. The method of claim 1, wherein the mainrotor is for use with a gaterotor in a compressor and wherein the speeds of rotation of said rotor body and said cutter are determined by a relationship between the number of grooves in the mainrotor and the number of teeth in the gaterotor.

7. The method of claim 6, wherein the speed of rotation of said cutter equals the speed of rotation of said rotor body times the ratio of the number of mainrotor grooves to the number of gaterotor teeth.

8. The method of claim 1, wherein the mainrotor is for use with a gaterotor in a compressor and wherein said cutter has a number of teeth equal to the number of teeth in the gaterotor.

9. The method of claim 1, further including a step of changing the relative speed between said rotor body and said cutter by a given amount for a given time which effects a positional change between said cutter teeth and the material of said rotor body thereby resulting in a desired change in the globoid screw profile.

10. The method of claim 9, wherein the globoid screw profile includes a helical groove having a pair of spaced apart sidewalls, and wherein said step of changing the relative speed between the rotorbody and the cutter comprises increasing or decreasing the relative speed depending upon which sidewall is being machined and to an extent depending upon the desired sidewall location.

11. The method of claim 10, wherein the cutter speed is increased or decreased relative to the synchronized speed of rotation depending upon which groove sidewall is to be machined.

12. The method of claim 10, wherein the cutter speed is changed relative to the synchronized speed of rotation to an extent sufficient to provide groove sidewalls which are parallel in the plane of a gaterotor operatively associated with the mainrotor when used in a compressor.

13. The method of claim 1, wherein said globoid screw profile is formed in a plurality of stages using different cutters at various stages.

14. A method of making a globoidal screw for use as a mainrotor in a compressor or expander comprising the steps of:

a) providing a cylindrical rotor body having a longitudinal axis and mounting said rotor body for rotation about said longitudinal axis;

b) providing a cutter having at least one tooth along a circumference disposed in a plane and having an axis of rotation disposed perpendicular to said plane;

c) mounting said cutter for rotation about said axis and with said cutter disposed so that the plane thereof is parallel to said rotor body longitudinal axis and that the rotational axis thereof is perpendicular to said rotor longitudinal axis;

d) rotating said rotor body and said cutter at synchronized speeds;

e) positioning said rotor body and said cutter relative to each other in a manner moving said cutter axis of rotation and said rotor body longitudinal axis relative to each other to decrease the distance between said axis while said rotor body and cutter are being rotated so that said cutter tooth contacts said rotor body during each cutter rotation to remove material from said rotor body by a milling action to form a globoid screw profile including a groove having a pair of spaced-apart sidewalls and extending along said rotor body in a helical path; and f) changing the relative speed between said rotor body and said cutter by a given amount for a given time to effect a positional change between said cutter tooth and the material of said rotor body thereby resulting in a desired change in the globoid screw profile, the relative speed being increased or decreased depending upon which groove sidewall is being machined and the speed change being to an extent depending upon the desired groove sidewall location.

15. The method of claim 14, wherein said cutter comprises a plurality of teeth at spaced locations around said circumference and wherein said step of positioning said rotor body and said cutter is performed in a manner such that a plurality of said cutter teeth contact said rotor body simultaneously during each cutter rotation.

16. The method of claim 14, wherein said cutter is moved toward said rotor body while said rotor body and said cutter are rotated.

17. The method of claim 14, wherein the mainrotor is for use with a gaterotor in a compressor and wherein the speed of rotation of said rotor body and said cutter are determined by a relationship between the number of grooves in the mainrotor and the number of teeth in the gaterotor.

18. The method of claim 17, wherein the speed of rotation of said cutter equals the speed of rotation of said rotor body times the ratio of the number of mainrotor grooves to the number of gaterotor teeth.

19. The method of claim 14, wherein the mainrotor is for use with a gaterotor in a compressor and wherein said cutter has a number of teeth equal to the number of teeth in the gaterotor.

20. The method of claim 14, wherein the cutter speed is changed relative to the synchronized speed of rotation for a duration sufficient to provide groove sidewalls which are parallel in the plane of a gaterotor operatively associated with the mainrotor when used in a compressor.

21. The method of claim 14, wherein said globoid screw profile is formed in a plurality of stages using different cutters at various stages.

22. Apparatus for machining a globoid screw from a cylindrical rotor body having a longitudinal axis for uses as a mainrotor in a compressor or expander, said apparatus comprising:

a) means for mounting said cylindrical rotor body for rotation about said longitudinal axis thereof;

b) a cutter having a plurality of teeth at spaced locations around a circumference disposed in a plane and having an axis of rotation disposed perpendicular to said plane;

c) means for mounting said cutter for rotation about said axis and with said cutter disposed so that the plane thereof is parallel to said rotor body longitudinal axis and so that the rotational axis thereof is perpendicular to said rotor body longitudinal axis;

d) drive means operatively associated with said rotor body and said cutter for rotating said rotor body and said cutter at synchronized speeds; and e) means for moving said cutter and said rotor body relative to each other so that said cutter axis of rotation and said rotor body longitudinal axis are moved relative to each other while said cutter and said rotor body are rotated so that said cutter teeth contact said rotor body during rotation of said cutter to remove material from said body by a milling action to form a globoid screw profile.

23. Apparatus according to claim 22, wherein said means for moving said cutter and said rotor body relative to each other is operatively associated with said cutter for moving said cutter toward said rotor body while said rotor body and said cutter are rotated.

24. Apparatus according to claim 22, wherein said cutter has a plurality of teeth in a star configuration so that a plurality of said teeth contact said rotor body simultaneously during each rotation of said cutter.

25. Apparatus according to claim 22, wherein the mainrotor is for use with a gaterotor in a compressor, and wherein said cutter has a number of teeth equal to the number of teeth in the gaterotor.

26. Apparatus according to claim 22, further including means operatively associated with said drive means for changing the relative speed between said rotor body and said cutter by a given amount for a given time to effect a positional change between said cutter teeth and the material of said rotor body thereby resulting in a desired change in the globoid screw profile.

27. Apparatus according to claim 26, wherein the globoid screw profile includes a helical groove having a pair of spaced apart sidewalls, and wherein said speed changing means comprises phase changing means for increasing or decreasing the relative speed depending upon which groove sidewall is being machined and to an extent depending upon the desired sidewall location.

28. Apparatus according to claim 22, wherein said cutter comprises a plurality of different cutters used at different stages during formation of said globoid screw profile.

29. Apparatus according to claim 22, wherein each of said cutter teeth has opposite flanks joined by an outer edge and wherein the majority of cutting occurs on the flanks.

30. Apparatus according to claim 29, wherein each of said cutter teeth is of relatively constant width having relatively short flanks which terminate in a relatively wide outer edge.

31. Apparatus according to claim 29, wherein each of said cutter teeth is of tapering width having relatively long flanks which terminate in a relatively narrow outer edge.

32. Apparatus according to claim 29, wherein each of said cutter teeth has serrations along one flank thereof.

33. Apparatus according to claim 29, wherein each of said cutter teeth has a cutting edge along only one flank thereof.

34. Apparatus according to claim 29, wherein alternate teeth have cutting edges on one flank thereof.

35. Apparatus according to claim 29, wherein each of said cutter teeth is provided with an insert of wear resistant material.

36. Apparatus for machining a globoid screw from a cylindrical rotor body having a longitudinal axis for uses as a mainrotor in a compressor, said apparatus comprising:

a) means for mounting said cylindrical rotor body for rotation about said longitudinal axis thereof;

b) a cutter having at least one tooth along a circumference disposed in a plane and having an axis of rotation disposed perpendicular to said plane;

c) means for mounting said cutter for rotation about said axis and with said cutter disposed so that the plane thereof is parallel to said rotor body longitudinal axis and so that the rotational axis thereof is perpendicular to said rotor body longitudinal axis;

d) drive means operatively associated with said rotor body and said cutter for rotating said rotor body and said cutter at synchronized speeds; and e) means for moving said cutter and said rotor body relative to each other so that said cutter axis of rotation and said rotor body longitudinal axis are moved relative to each other while said cutter and said rotor body are rotated so that said cutter tooth contacts said rotor body during each rotation of said cutter to remove material from said body by a milling action to form a globoid screw profile including a groove having a pair of spaced-apart sidewalls and extending along said rotor body in a helical path; and f) means operatively associated with said drive means for changing the relative speed between said rotor body and said cutter by a given amount for a given time to effect a positional change between said cutter tooth and the material of said rotor body thereby resulting in a desired change in the globoid screw profile, the relative speed being increased or decreased depending upon which groove sidewall is being machined and the speed change being to an extent depending upon the desired groove sidewall location.

37. Apparatus according to claim 36, wherein said means for moving said cutter and said rotor body relative to each other is operatively associated with said cutter for moving said cutter toward said rotor body which said rotor body and said cutter are rotated.

38. Apparatus according to claim 36, wherein said cutter compresses a plurality of teeth at spaced locations around said circumference so that a plurality of said teeth contact said rotor body simultaneously during each cutter rotation.

39. Apparatus according to claim 38, wherein the main-rotor is for use with a gaterotor in a compressor, and wherein said cutter has a number of teeth equal to the number of teeth in the gaterotor.

40. Apparatus according to claim 36, wherein said cutter comprises a plurality of different cutters used at different stages during formation of said globoid screw profile.

41. Apparatus according to claim 36, wherein each of said cutter teeth has opposite flanks joined by an outer edge and wherein the majority of cutting occurs on the flanks.

42. Apparatus according to claim 41, wherein each of said cutter teeth is of relatively constant width having relatively short flanks which terminate in a relatively wide outer edge.

43. Apparatus according to claim 41, wherein each of said cutter teeth is of tapering width having relatively long flanks which terminate in a relatively narrow outer edge.

44. Apparatus according to claim 41, wherein each of said cutter teeth has serrations along one flank thereof.

45. Apparatus according to claim 41, wherein each of said cutter teeth has a cutting edge along only one flank thereof.

46. Apparatus according to claim 41, wherein alternate teeth have cutting edges on one flank thereof.

47. Apparatus according to claim 41, wherein each of said cutter teeth is provided with an insert of wear resistant material.

\* \* \* \* \*